US012587619B2

(12) United States Patent
Mori

(10) Patent No.: US 12,587,619 B2
(45) Date of Patent: Mar. 24, 2026

(54) METHOD OF ADJUSTING PROJECTION IMAGE, PROJECTION SYSTEM, AND CONTROL APPARATUS

(71) Applicant: SEIKO EPSON CORPORATION, Tokyo (JP)

(72) Inventor: Yuki Mori, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 30 days.

(21) Appl. No.: 18/175,641

(22) Filed: Feb. 28, 2023

(65) Prior Publication Data

US 2023/0276036 A1      Aug. 31, 2023

(30) Foreign Application Priority Data

Feb. 28, 2022      (JP) .................................. 2022-029144

(51) Int. Cl.
*H04N 9/31*                (2006.01)
(52) U.S. Cl.
CPC ......... *H04N 9/3185* (2013.01); *H04N 9/3194* (2013.01)
(58) Field of Classification Search
CPC ............... H04N 9/3185; H04N 9/3194; H04N 9/31–3108; H04N 9/3126; H04N 9/3132; H04N 9/3135; H04N 9/3197; H04N 9/3188; H04N 9/3141; H04N 9/3155; G02F 1/133; G02B 26/08; G03B 21/005–008
See application file for complete search history.

(56) References Cited

U.S. PATENT DOCUMENTS

| | | | |
|---|---|---|---|
| 2004/0061838 A1 | 4/2004 | Mochizuki et al. | |
| 2005/0168705 A1* | 8/2005 | Li | H04N 5/74 |
| | | | 353/69 |
| 2008/0284987 A1* | 11/2008 | Yonezawa | H04N 9/3194 |
| | | | 353/121 |
| 2009/0207411 A1* | 8/2009 | Oakley | G03B 33/12 |
| | | | 356/400 |
| 2019/0037186 A1* | 1/2019 | Yoshimura | H04N 21/42204 |
| 2020/0092524 A1* | 3/2020 | Morris | G01B 11/2513 |

FOREIGN PATENT DOCUMENTS

JP          2006246502 A       9/2006

* cited by examiner

*Primary Examiner* — John W Miller
*Assistant Examiner* — Humam M Satti
(74) *Attorney, Agent, or Firm* — Dority & Manning, P.A.

(57)                ABSTRACT

A second control unit of a projector specifies a first area in a liquid crystal panel corresponding to a projection area based on the projection area in a first captured image formed by imaging of a screen, a first image in the first captured image, and the first image in the liquid crystal panel, draws a second image larger than the first image within the first area, and specifies a second area in the liquid crystal panel corresponding to the projection area based on the projection area in a second captured image formed by imaging of the screen with an image light corresponding to the second image projected thereon, the second image in the second captured image, and the second image in the liquid crystal panel.

12 Claims, 10 Drawing Sheets

1A

METHOD OF ADJUSTING PROJECTION IMAGE, PROJECTION SYSTEM, AND CONTROL APPARATUS

The present application is based on, and claims priority from JP Application Serial Number 2022-029144, filed Feb. 28, 2022, the disclosure of which is hereby incorporated by reference herein in its entirety.

BACKGROUND

1. Technical Field

The present disclosure relates to a method of adjusting a projection image, a projection system, and a control apparatus.

2. Related Art

In related art, a method of adjusting a shape of an image projected by a projector to conform to a shape of a projection surface is known.

For example, JP-A-2006-246502 discloses a projector apparatus detecting a position relationship between the projector apparatus and a screen by projecting a test pattern on the screen and calculating distances between a plurality of points on a display window and the projector apparatus from an image captured by an image sensor.

However, when the projection surface with an image projected thereon is imaged and the display position and the shape of the projection image are corrected based on the captured image, if the image projected on the projection surface spreads outside the projection surface, adjustment accuracy of the image may be lower.

SUMMARY

An aspect according to the present disclosure is a method of adjusting a projection image including drawing a first image having a first size on a drawing panel, projecting the first image on a projection surface, detecting an area of the projection surface and the first image from a first captured image formed by imaging of the projection surface with the first image projected thereon, specifying a first area in the drawing panel corresponding to the area of the projection surface based on the area of the projection surface in the first captured image, the first image in the first captured image, and the first image in the drawing panel, drawing a second image having a second size larger than the first size within the first area, projecting the second image on the projection surface, detecting the area of the projection surface and the second image from a second captured image formed by imaging of the projection surface with the second image projected thereon, specifying a second area in the drawing panel corresponding to the area of the projection surface based on the area of the projection surface in the second captured image, the second image in the second captured image, and the second image in the drawing panel, drawing a projection image within the second area, and projecting the projection image on the projection surface.

An aspect according to the present disclosure is a projection system including a projector including a drawing panel and projecting a first image having a first size drawn on the drawing panel on a projection surface, an imaging apparatus imaging the projection surface with the first image projected thereon and generating a first captured image, and a control apparatus executing detecting an area of the projection surface and the first image from the first captured image, specifying a first area in the drawing panel corresponding to the area of the projection surface based on the area of the projection surface in the first captured image, the first image in the first captured image, and the first image in the drawing panel, and transmitting first information representing the first area to the projector, wherein the projector executes drawing a second image having a second size larger than the first size within the first area represented by the first information, and projecting the second image on the projection surface, the imaging apparatus generates a second captured image by imaging the projection surface with the second image projected thereon, and the control apparatus executes detecting the area of the projection surface and the second image from the second captured image, specifying a second area in the drawing panel corresponding to the area of the projection surface based on the area of the projection surface in the second captured image, the second image in the second captured image, and the second image in the drawing panel, and transmitting second information representing the second area to the projector.

An aspect according to the present disclosure is a control apparatus executing receiving a first captured image formed by imaging of a projection surface with a first image having a first image projected thereon from an imaging apparatus, receiving information of the first image drawn on a drawing panel of a projector from the projector projecting the first image on the projection surface, detecting an area of the projection surface and the first image from the first captured image, specifying a first area in the drawing panel corresponding to the area of the projection surface based on the area of the projection surface in the first captured image, the first image in the first captured image, and the information of the first image, transmitting first information representing the first area to the projector, receiving a second captured image formed by imaging of the projection surface with a second image having a second size larger than the first image projected thereon from the imaging apparatus, detecting the area of the projection surface and the second image from the second captured image, specifying a second area in the drawing panel corresponding to the area of the projection surface based on the area of the projection surface in the second captured image, the second image in the second captured image, and the first information, and transmitting second information representing the second area to the projector.

DESCRIPTION OF EXEMPLARY EMBODIMENTS

As below, an embodiment of the present disclosure will be explained with reference to the accompanying drawings.

1. Description of System Configuration of Projection System

Figure 1:
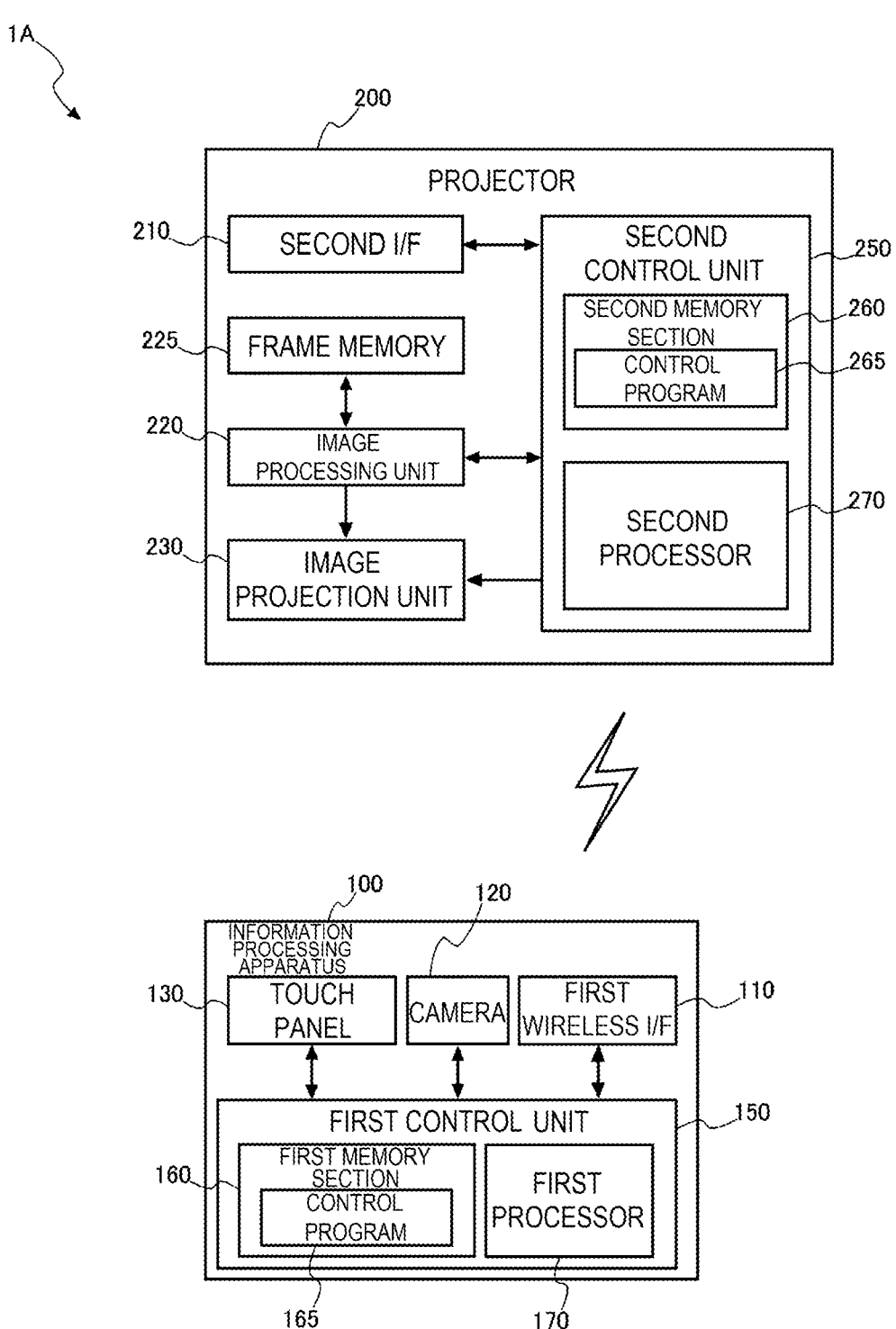
FIG. 1 shows a system configuration of a projection system.

FIG. 1 shows a system configuration of a projection system 1A.

The projection system 1A includes an information processing apparatus 100 and a projector 200.

The information processing apparatus 100 is used as an apparatus supplying image data from which an image to be projected by the projector 200 is formed to the projector 200 and receiving operations to change the shape and the display position of the image projected by the projector 200. For the information processing apparatus 100, e.g., a smartphone, a tablet computer, or a notebook computer is used.

The projector 200 generates an image light based on the image data supplied from the information processing apparatus 100 and projects the generated image light on a screen 5.

2. Configuration of Information Processing Apparatus

A configuration of the information processing apparatus 100 is explained.

The information processing apparatus 100 includes a first wireless interface, a camera 120, a touch panel 130, and a first control unit 150. Hereinafter, the interface 110 is abbreviated as I/F.

The first wireless I/F 110 is e.g., a wireless communication device including an interface circuit compliant to a standard of Bluetooth, Wi-Fi, or the like. Bluetooth and Wi-Fi are registered trademarks. The first wireless I/F 110 wirelessly connects to the projector 200 and makes mutual data communication between the projector 200 and itself. Further, the information processing apparatus 100 in the embodiment may include a wired I/F 140 provided in the information processing apparatus 100 forming a projection system 1B shown in a modified example, which will be described later, and may make data communication with the projector 200 by wired communication using the wired I/F 140. The wired I/F 140 may include an interface circuit.

The camera 120 includes an imaging lens, an imaging device such as a CCD (Charge Coupled Device) or a CMOS (Complementary MOS), and a data processing circuit. The imaging lens, the imaging device, and the data processing circuit are not shown. The camera 120 executes imaging according to control by the first control unit 150 and generates a captured image 70. The camera 120 outputs the generated captured image 70 to the first control unit 150.

The touch panel 130 includes a display panel and a touch sensor and receives a touch operation by a user. The display panel and the touch sensor are not shown. For the display panel, e.g., a liquid crystal panel or an organic EL (Electro Luminescence) panel is used. The touch sensor detects the touch operation on the display panel by the user. A coordinate system is set in advance on the display panel, and the touch sensor outputs an operation signal containing coordinate information representing the position in the coordinate system touched by the user to the first control unit 150.

The first control unit 150 is a computer apparatus including a first memory section 160 and a first processor 170.

The first memory section 160 includes a non-volatile memory such as a ROM (Read Only Memory) and a volatile memory such as a RAM (Random Access Memory). The ROM stores a control program 165 including an OS (Operating System) and an application program, a configuration file for specifying the operation of the information processing apparatus 100, etc. The RAM is used as an arithmetic area for the first processor 170.

The first processor 170 is an arithmetic processing unit including one or more CPUs (Central Processing Units) or MPUs (Micro-Processing Units). The first processor 170 executes the control program 165 and controls operation of the individual units of the information processing apparatus 100.

3. Configuration of Projector

Next, a configuration of the projector 200 is explained.

The projector 200 includes a second wireless I/F 210, an image processing unit 220, a frame memory 225, an image projection unit 230, and a second control unit 250.

The second wireless I/F 210 is e.g., a wireless communication device including an interface circuit compliant to a standard of Bluetooth, Wi-Fi, or the like. The second wireless I/F 210 wirelessly connects to the information processing apparatus 100 and mutually makes data communication between the information processing apparatus 100 and itself. Further, the projector 200 may make data communication with the information processing apparatus 100 by wired communication using a wired I/F (not shown). The wired I/F may include an interface circuit.

The frame memory 225 is coupled to the image processing unit 220. The image processing unit 220 loads the image data input from the second control unit 250 or the second wireless I/F 210 in the frame memory 225. The frame memory 225 includes e.g., an SDRAM (Synchronous Dynamic Random Access Memory).

The image processing unit 220 performs image processing including e.g., resolution conversion processing or resizing processing, distortion correction, shape correction processing, digital zoom processing, adjustment of image hue and brightness on the image data loaded in the frame memory 225. The image processing unit 220 executes image processing designated by the second control unit 250 and performs processing using a parameter input from the second control unit 250 as necessary. Obviously, the image processing unit 220 can combine and execute some of the plurality of kinds of image processing. The image processing unit 220 reads out the processed image data from the frame memory 225 and outputs the read out image data to a light modulation device 233 of the image projection unit 230.

For example, the image processing unit 220 and the frame memory 225 are formed using an integrated circuit. The integrated circuit includes an LSI (Large Scale Integrated Circuit), an ASIC (Application Specific Integrated Circuit), a PLD (Programmable Logic Device), an FPGA (Field- Programmable Gate Array), an SoC (System-on-a-chip), etc. Further, a part of the configuration of the integrated circuit may include an analog circuit or the second control unit 250 and the integrated circuit may be combined.

Figure 2:
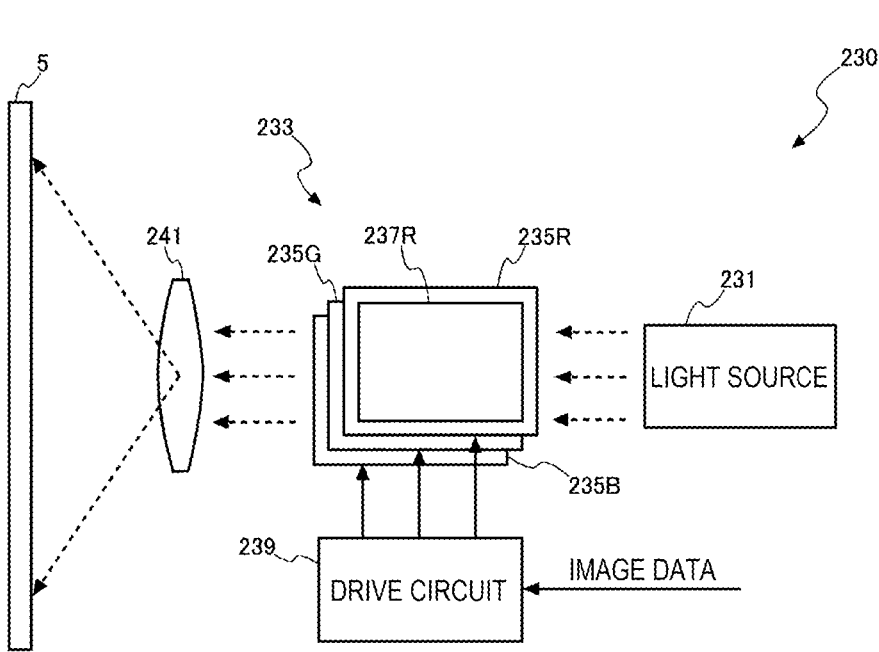
FIG. 2 is a block diagram showing a configuration of an image projection unit.

FIG. 2 is a block diagram showing a configuration of the image projection unit 230.

Referring to FIG. 2, the configuration of the image projection unit 230 is explained.

The image projection unit 230 includes a light source 231, the light modulation device 233, and an optical unit 241. The light modulation device 233 of the embodiment includes three transmissive liquid crystal panels 235R, 235G, 235B corresponding to three colors of red, green, and blue as light modulation elements and a drive circuit 239 driving these liquid crystal panels 235R, 235G, 235B. R is an abbreviation for Red, G is an abbreviation for Green, and B is an abbreviation for Blue. Hereinafter, the liquid crystal panels 235R, 235G, 235B of the projector 200 are collectively referred to as "liquid crystal panel 235". The light modulation elements of the light modulation device 233 are not limited to the transmissive liquid crystal panels 235R, 235G, 235B, but may be e.g., reflective liquid crystal panels or DMDs (Digital Micromirror Devices). The liquid crystal panels 235R, 235G, 235B, the reflective liquid crystal panels, and the DMDs correspond to a drawing panel.

The light source 231 is a discharge light source lamp such as a super high-pressure mercury lamp or a metal halide lamp or a solid-state light source such as a light emitting diode or a semiconductor laser. The light output from the light source 231 is entered into the liquid crystal panel 235. Each of the liquid crystal panels 235R, 235G, 235B includes, for example, a transmissive liquid crystal panel enclosing liquid crystal between a pair of transparent substrates. The liquid crystal panel 235R modulates a red light, the liquid crystal panel 235G modulates a green light, and the liquid crystal panel 235B modulates a blue light. In each liquid crystal panel 235, a panel area 237 including a plurality of pixels arranged in a matrix form is provided. The panel area 237 of the liquid crystal panel 235R is referred to as "panel area 237R", the panel area 237 of the liquid crystal panel 235G is referred to as "panel area 237G", and the panel area 237 of the liquid crystal panel 235B is referred to as "panel area 237B". Further, the panel areas 237R, 237G, and 237B are collectively referred to as "panel area 237".

The image data is input from the image processing unit 220 to the drive circuit 239. The drive circuit 239 applies drive voltages corresponding to the input image data to the respective pixels of the panel area 237 and changes the light transmittance of the respective pixels to transmittance corresponding to the image data. The light output from the light source 231 is transmitted through the panel areas 237 and the light is modulated and image lights corresponding to the image data are formed with respect to each color light of the red light, the green light, and the blue light. The formed image lights in the individual colors are combined by a light combining system (not shown) into an image light representing a color image. The optical unit 241 includes a projection lens etc. and enlarges and projects the image light modulated by the liquid crystal panels 235 on a projection area 51. Thereby, in the projection area 51, a projection image as an image corresponding to the image light is displayed.

Figure 3:
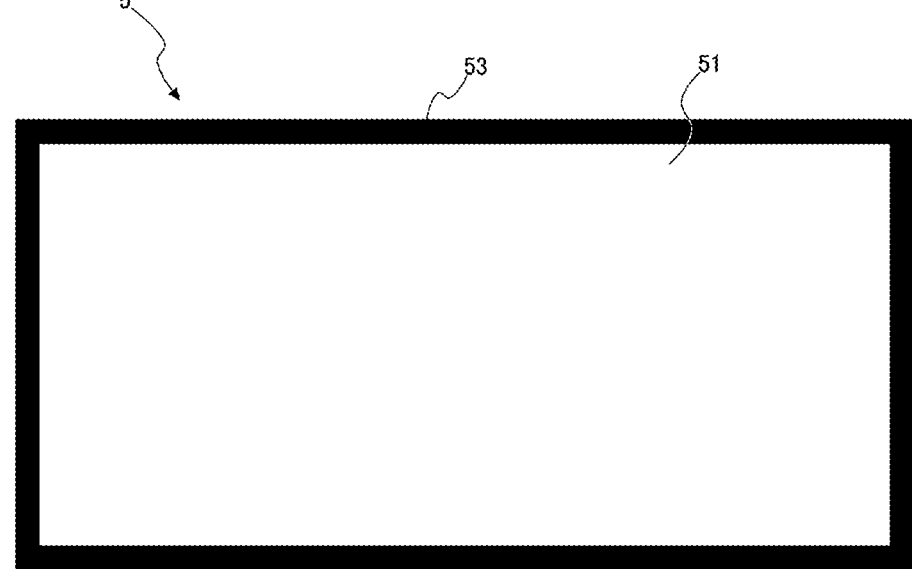
FIG. 3 shows an example of a screen.

FIG. 3 shows an example of the screen 5.

Here, referring to FIG. 3, the screen 5 on which the projector 200 projects the projection image is explained.

The screen 5 includes the projection area 51 and a background area 53. The projection area 51 corresponds to a projection surface. The projection area 51 is an area on which the image light is projected and the projection image corresponding to the projected image light is displayed.

The background area 53 is an area as a background of the projection area 51 and contacts the projection area 51 outside of the projection area 51. Further, the background area 53 is the area as the background of the projection area 51, in which, even when the image light is projected on the background area 53, the image is not displayed to be visually recognizable. The projection area 51 and the background area 53 have a brightness difference therebetween. For example, the projection area 51 is an area having a higher brightness value in white or the like and the background area 53 is an area having lower brightness in black or the like. As long as the background area 53 has a brightness difference equal to or higher than a fixed value from the projection area 51 and, for example, a wall within a room, a curtain, or the like may be used instead.

Returning to FIG. 1, the configuration of the projector 200 is subsequently explained.

The second control unit 250 is a computer apparatus including a second memory section 260 a second processor 270.

The second memory section 260 includes a volatile memory such as a RAM and a non-volatile memory such as a ROM. The RAM is used for temporary storage of various kinds of data etc. and the ROM stores a control program 265 used for control of the operation of the projector 200 and various kinds of setting information.

The second processor 270 is an arithmetic processing unit including one or more CPUs or MPUs. The second processor 270 executes the control program 265 and controls the individual units of the projector 200.

The second control unit 250 receives e.g., an instruction signal to start image adjustment from the information processing apparatus 100, and then, starts the image adjustment. The image adjustment is processing of adjusting distortion of the shape of the projection image, and the display position and the display size of the projection image displayed on the screen 5.

Figures 4, 5:
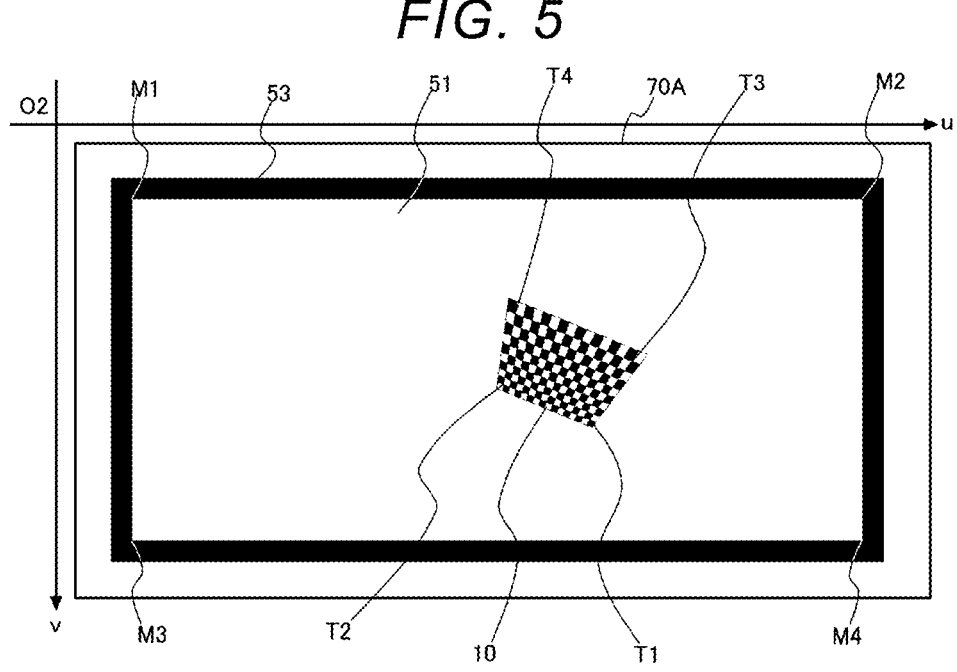
FIG. 4 shows an example of a first image drawn on a liquid crystal panel.
FIG. 5 shows an example of a first captured image.

FIG. 4 shows an example of a first image 10 drawn in the panel area 237.

The second control unit 250 first displays the first image 10 on the screen 5.

Figure 11:
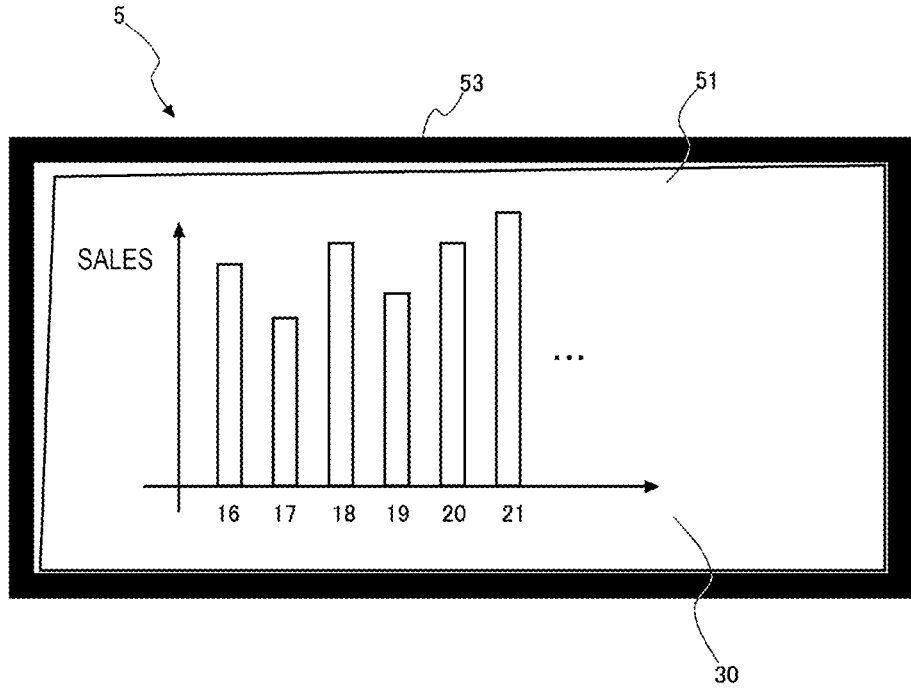
FIG. 11 shows an example of a projection image projected on the screen.
Figure 13:
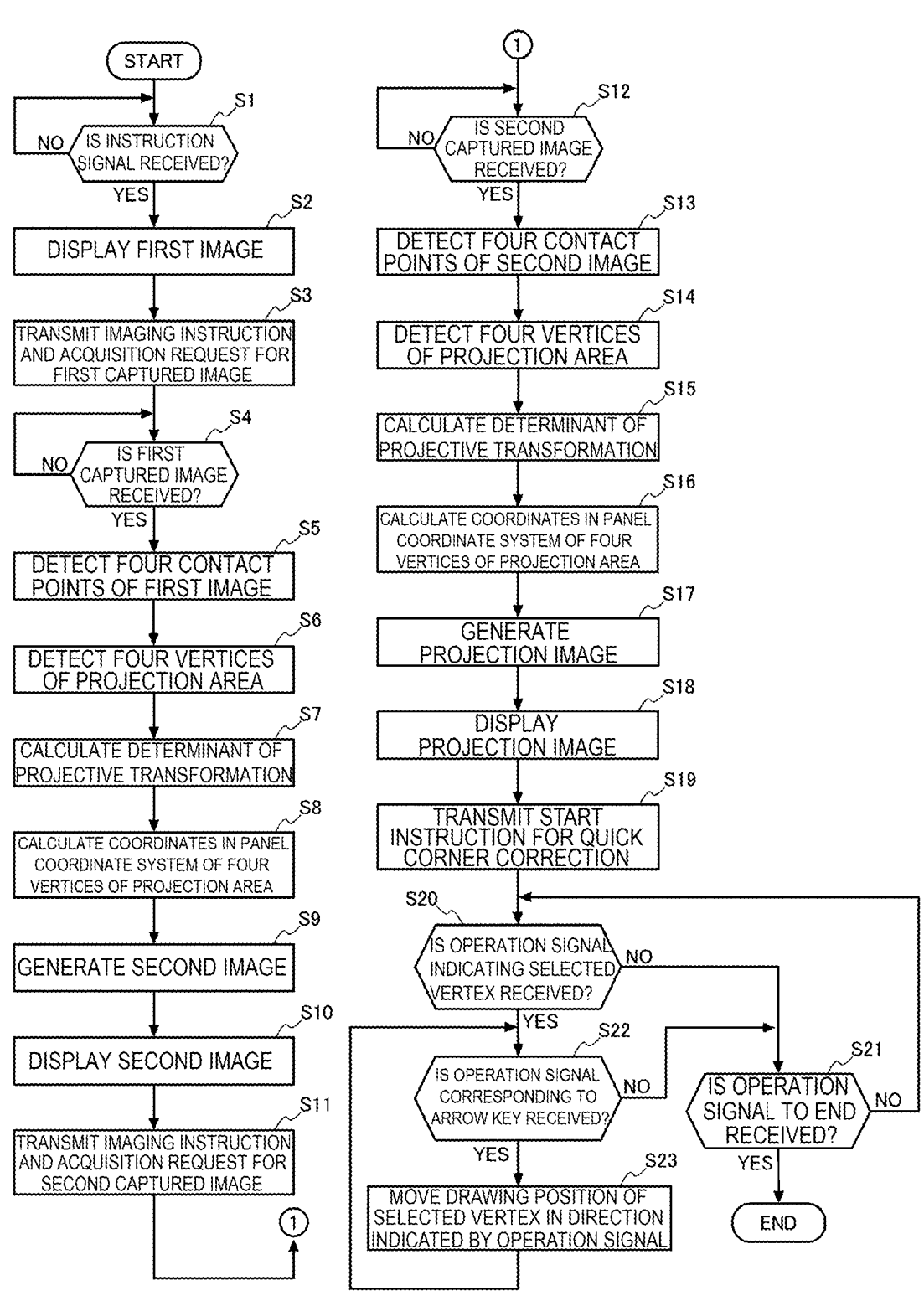
FIG. 13 is a flowchart showing an operation of a projector.

As shown in FIG. 4, the first image 10 is a pattern image in which first rectangular figures (shapes) 11 and second rectangular figures (shapes) 13 having the same shape and size are alternately arranged in longitudinal directions and lateral directions of the first image 10 on the panel area 237. The first rectangular FIG. 11 is a black rectangle and the second rectangular FIG. 13 is a white rectangle. The color of the first rectangular FIG. 11 is not limited to black and the color of the second rectangular FIG. 13 is not limited to white. As long as the color of the first rectangular FIG. 11 and the color of the second rectangular FIG. 13 are different, for example, colors in a relationship of complementary colors in a color circle may be used for the first rectangular FIG. 11 and the second rectangular FIG. 13.

The second control unit 250 generates the first image 10. Further, the first image 10 may be stored in the second memory section 260 in advance. The second control unit 250 generates the first image 10, and then, controls the image processing unit 220 and the image projection unit 230 to draw the generated first image 10 in the panel area 237 of the liquid crystal panel 235. The light output from the light source 231 is transmitted through the panel area 237 and modulated into an image light corresponding to the first image 10, and the modulated image light is displayed in the projection area 51.

The first image 10 is formed in a first size. The size of the first image 10 is e.g., the number of display pixels forming the first image 10 when the first image 10 is drawn in the liquid crystal panel 235. In this case, the size of the first image 10 may be restated as display resolution of the first image 10 or resolution of the first image 10. The size of the first image 10 may be the number of all display pixels forming the first image 10. Or, the size of the first image 10 may be the number of display pixels in horizontal directions or the number of display pixels in vertical directions forming the first image 10.

The first size is expressed by the resolution of the first image 10 or the number of display pixels of the liquid crystal panel 235 on which the first image 10 is drawn. The same applies to a second size, which will be described later.

The resolution of the first image 10 is e.g., preset resolution sufficiently lower than the panel resolution of the liquid crystal panel 235. Here, a reason for setting the resolution of the first image 10 to resolution sufficiently lower than the panel resolution of the liquid crystal panel 235 is explained.

When the screen 5 is imaged by the camera 120 of the information processing apparatus 100 and the projection image and a boundary between the projection area 51 and the background area 53 are detected using the generated captured image 70, it is preferable that the projection image is displayed near the boundary line between the projection area 51 and the background area 53.

This is because the value of the distortion parameter of the camera 120 is unknown and an error tends to increase due to the influence by the distortion parameter as the distance between the projection image and the boundary between the projection area 51 and the background area 53 is larger.

However, when the size of the first image 10 is excessively increased for display of the first image 10 near the boundary line between the projection area 51 and the background area 53, the first image 10 may be partially out of the projection area 51 and the detection of the first image 10 may be unsuccessful. Accordingly, in the embodiment, the resolution of the first image 10 is set to be sufficiently smaller than the panel resolution of the liquid crystal panel 235, and thereby, the projected first image 10 being partially out of the projection area 51 is suppressed.

The camera 120 generates the captured image 70 by imaging the screen 5 with the first image 10 displayed thereon. The captured image 70 formed by imaging of the screen 5 with the first image 10 displayed thereon is referred to as "first captured image 70A". The first image 10 and the projection area 51 are detected from the first captured image 70A and a second image 20 is projected on the screen 5 again based on the detection result. Here, the projection area 51 is detected from the first captured image 70A. Accordingly, the shape and the resolution of the second image 20 are changed based on the detection result, and thereby, the second image 20 may be displayed near the boundary line between the projection area 51 and the background area 53. The second image 20 will be described later.

The first image 10 contains four contact points of a first contact point T1, a second contact point T2, a third contact point T3, and a fourth contact point T4. The four contact points of the first contact point T1, the second contact point T2, the third contact point T3, and the fourth contact point T4 contained in the first image 10 are an example of at least four images having preset shapes.

The first contact point T1 is placed in a position corresponding to the upper left vertex of the first image 10 in the view of the drawing. The first contact point T1 is a point at which the lower right vertex of a first rectangular FIG. 11A, the lower left vertex of a second rectangular FIG. 13B, the upper right vertex of a second rectangular FIG. 13C, and the upper left vertex of a first rectangular FIG. 11D contact in the view of the drawing.

The first rectangular FIG. 11A, the second rectangular FIG. 13B, the second rectangular FIG. 13C, and the first rectangular FIG. 11D correspond to the images having preset shapes contained in the first image 10.

The first rectangular FIG. 11A is a figure located on the upper left of the first image 10 in the view of the drawing.

The second rectangular FIG. 13B is a figure in contact with the first rectangular FIG. 11A on the right side of the first rectangular FIG. 11A in the view of the drawing.

The second rectangular FIG. 13C is a figure in contact with the first rectangular FIG. 11A on the downside of the first rectangular FIG. 11A in the view of the drawing.

The first rectangular FIG. 11D is a figure in contact with the second rectangular FIG. 13C on the right side of the second rectangular FIG. 13C in the view of the drawing.

Here, the view of the drawing is a view of the drawing with an origin O1 of the panel coordinate system or an origin O2 of an imaging coordinate system, which will be described later, on the upper left.

The second contact point T2 is placed in a position corresponding to the upper right vertex of the first image 10 in the view of the drawing.

The second contact point T2 is a point at which the lower left vertex of a second rectangular FIG. 13E, the lower right vertex of a first rectangular FIG. 11F, the upper left vertex of a first rectangular FIG. 11G, and the upper right vertex of a second rectangular FIG. 13H contact in the view of the drawing. The second rectangular FIG. 13E, the first rectangular FIG. 11F, the first rectangular FIG. 11G, and the second rectangular FIG. 13H correspond to the images having preset shapes contained in the first image 10.

The second rectangular FIG. 13E is a figure located on the upper right of the first image 10 in the view of the drawing.

The first rectangular FIG. 11F is a figure in contact with the second rectangular FIG. 13E on the left side of the second rectangular FIG. 13E in the view of the drawing.

The first rectangular FIG. 11G is a figure in contact with the second rectangular FIG. 13E on the downside of the second rectangular FIG. 13E in the view of the drawing.

The second rectangular FIG. 13H is a figure in contact with the first rectangular FIG. 11G on the left side of the first rectangular FIG. 11G in the view of the drawing.

The third contact point T3 is placed in a position corresponding to the lower left vertex of the first image 10 in the view of the drawing.

The third contact point T3 is a point at which the upper right vertex of a second rectangular FIG. 13I, the upper left vertex of a first rectangular FIG. 11J, the lower right vertex of a first rectangular FIG. 11K, and the lower left vertex of a second rectangular FIG. 13L contact in the view of the drawing. The second rectangular FIG. 13I, the first rectangular FIG. 11J, the first rectangular FIG. 11K, and the second rectangular FIG. 13L correspond to the images having preset shapes contained in the first image 10.

The second rectangular FIG. 13I is a figure located on the lower left of the first image 10 in the view of the drawing.

The first rectangular FIG. 11J is a figure in contact with the second rectangular FIG. 13I on the right side of the second rectangular FIG. 13I in the view of the drawing.

The first rectangular FIG. 11K is a figure in contact with the second rectangular FIG. 13I on the upside of the second rectangular FIG. 13I in the view of the drawing.

The second rectangular FIG. 13L is a figure in contact with the first rectangular FIG. 11K on the right side of the first rectangular FIG. 11K in the view of the drawing.

The fourth contact point T4 is placed on the lower right of the first image 10 in the view of the drawing.

The fourth contact point T4 is a point at which the upper left vertex of a first rectangular FIG. 11M, the upper right vertex of a second rectangular FIG. 13N, the lower left vertex of a second rectangular FIG. 13O, and the lower right vertex of a first rectangular FIG. 11P contact in the view of the drawing. The first rectangular FIG. 11M, the second rectangular FIG. 13N, the second rectangular FIG. 13O, and the first rectangular FIG. 11P correspond to the images having preset shapes contained in the first image 10.

The first rectangular FIG. 11M is a figure located on the lower right of the first image 10 in the view of the drawing.

The second rectangular FIG. 13N is a figure in contact with the first rectangular FIG. 11M on the left side of the first rectangular FIG. 11M in the view of the drawing.

The second rectangular FIG. 13O is a figure in contact with the first rectangular FIG. 11M on the upside of the first rectangular FIG. 11M in the view of the drawing.

The first rectangular FIG. 11P is a figure in contact with the second rectangular FIG. 13O on the left side of the second rectangular FIG. 13O in the view of the drawing.

The second control unit 250 displays the first image 10 on the screen 5, and then, transmits an imaging instruction and an acquisition request for the first captured image 70A to the information processing apparatus 100. When receiving the imaging instruction and the acquisition request from the projector 200, the first control unit 150 displays an imaging guide on the touch panel 130. The imaging guide is a sign for guiding the user to operate the camera 120 and image the screen 5.

When the imaging guide is displayed on the touch panel 130, the user holds the information processing apparatus 100 and moves to an imaging position. The imaging position is a position where the entire screen 5 is within the angle of view of the camera 120. More specifically, the imaging position is a position where the center in the lateral direction of the screen 5 is located at the center in the lateral direction of the angle of view of the camera 120.

When moving to the imaging position, the user executes imaging by the camera 120. When the first captured image 70A is input from the camera 120, the first control unit 150 transmits the input first captured image 70A to the projector 200.

FIG. 5 shows an example of the first captured image 70A.

When receiving the first captured image 70A from the information processing apparatus 100, the second control unit 250 detects the first image 10 and the projection area 51 by an image analysis of the received first captured image 70A.

The second control unit 250 sets a coordinate system on the input first captured image 70A. The coordinate system is referred to as "imaging coordinate system". As shown in FIG. 5, the imaging coordinate system is a coordinate system having the origin O2 on the upper left of the first captured image 70A, a u-axis in the lateral directions of the first captured image 70A, and a v-axis in the longitudinal directions in the view of the drawing. The second control unit 250 detects the four contact points of the first contact point T1, the second contact point T2, the third contact point T3, and the fourth contact point T4 shown in FIG. 4 as the first image 10 from the first captured image 70A. The second control unit 250 acquires coordinates in the imaging coordinate system of the four contact points of the first contact point T1, the second contact point T2, the third contact point T3, and the fourth contact point T4. The four contact points of the first contact point T1, the second contact point T2, the third contact point T3, and the fourth contact point T4 in the imaging coordinate system set on the first captured image 70A correspond to four points contained in the first image in the first captured image.

Further, the second control unit 250 detects the projection area 51 from the first captured image 70A. The second control unit 250 detects the positions of the four vertices of the projection area 51. The second control unit 250 detects the projection area 51 based on changes in brightness value of the first captured image 70A. The projection area 51 is white and the background area 53 is black, and the brightness value largely changes on the boundary line between the projection area 51 and the background area 53. The second control unit 250 compares the change of the brightness value of the pixel of the first captured image 70A to a preset threshold and specifies the pixels with the changes in brightness value equal to or larger than the threshold.

For example, the second control unit 250 detects the pixels having differences in brightness value between the target pixel and the previous target pixel equal to or larger than a threshold while changing the target pixel from the center in the longitudinal direction toward the outside in the longitudinal direction of the first captured image 70A. When detecting the pixel having the difference in brightness value equal to or larger than the threshold, the second control unit 250 determines the target pixel as the pixel located in the background area 53 outside of the projection area 51. The second control unit 250 determines the pixel previous to the target pixel as the pixel located on the boundary line between the projection area 51 and the background area 53 within the projection area 51. The second control unit 250 acquires the coordinates of the pixel determined as being located on the boundary line in the imaging coordinate system.

Similarly, the second control unit 250 detects the pixels having differences in brightness value between the target pixel and the previous target pixel equal to or larger than the threshold while changing the target pixel from the center in the lateral direction toward the outside in the lateral direction of the first captured image 70A. When detecting the pixel having the difference in brightness value equal to or larger than the threshold, the second control unit 250 determines the target pixel as the pixel located in the background area 53 outside of the projection area 51. The second control unit 250 determines the pixel previous to the target pixel as the pixel located on the boundary line between the projection area 51 and the background area 53 within the projection area 51. The second control unit 250 acquires the coordinates of the pixel determined as being located on the boundary line in the imaging coordinate system.

When respectively detecting the pixels located on the boundary lines of the projection area 51 on the four sides of the projection area 51, the second control unit 250 specifies the pixels located at the four vertices of the projection area 51.

The upper left point of the projection area 51 is referred to as "vertex M1", the upper right point is referred to as "vertex M2", the lower left point is referred to as "vertex M3", and the lower right point is referred to as "vertex M4".

The vertex M1 corresponds to the pixel at the minimum coordinate values on the u-axis and the v-axis of the pixels located on the boundary line between the projection area 51 and the background area 53.

The vertex M2 corresponds to the pixel at the maximum coordinate value on the u-axis and the minimum coordinate value on the v-axis of the pixels located on the boundary line between the projection area 51 and the background area 53.

The vertex M3 corresponds to the pixel at the minimum coordinate value on the u-axis and the maximum coordinate value on the v-axis of the pixels located on the boundary line between the projection area 51 and the background area 53.

The vertex M4 corresponds to the pixel at the maximum coordinate values on the u-axis and the v-axis of the pixels located on the boundary line between the projection area 51 and the background area 53.

Then, the second control unit 250 calculates a projective transformation matrix. The second control unit 250 calculates the projective transformation matrix using coordinates in the panel coordinate system of the first contact point T1, the second contact point T2, the third contact point T3, and the fourth contact point T4 in the first image 10 and the coordinates in the imaging coordinate system of the first contact point T1, the second contact point T2, the third contact point T3, and the fourth contact point T4 in the first captured image 70A. The panel coordinate system is the coordinate system set for the panel area 237 of the liquid crystal panel 235 with the origin O1 on the upper left of the panel area 237 and an s-axis in the lateral directions and a t-axis in the longitudinal directions in the view of the drawing as shown in FIG. 4.

The coordinates in the panel coordinate system of the first contact point T1, the second contact point T2, the third contact point T3, and the fourth contact point T4 are coordinates showing the positions of the first contact point T1, the second contact point T2, the third contact point T3, and the fourth contact point T4 of the first image 10 drawn on the liquid crystal panel 235. Further, the coordinates in the imaging coordinate system of the first contact point T1, the second contact point T2, the third contact point T3, and the fourth contact point T4 are coordinates of the first contact point T1, the second contact point T2, the third contact point T3, and the fourth contact point T4 detected from the first captured image 70A. The four contact points of the first contact point T1, the second contact point T2, the third contact point T3, and the fourth contact point T4 of the first image 10 in the panel coordinate system correspond to four points contained in the first image in the drawing panel. Further, the four contact points of the first contact point T1, the second contact point T2, the third contact point T3, and the fourth contact point T4 of the first image 10 in the panel coordinate system correspond to the respective four contact points of the first contact point T1, the second contact point T2, the third contact point T3, and the fourth contact point T4 in the imaging coordinate system set on the first captured image 70A.

Figure 6:
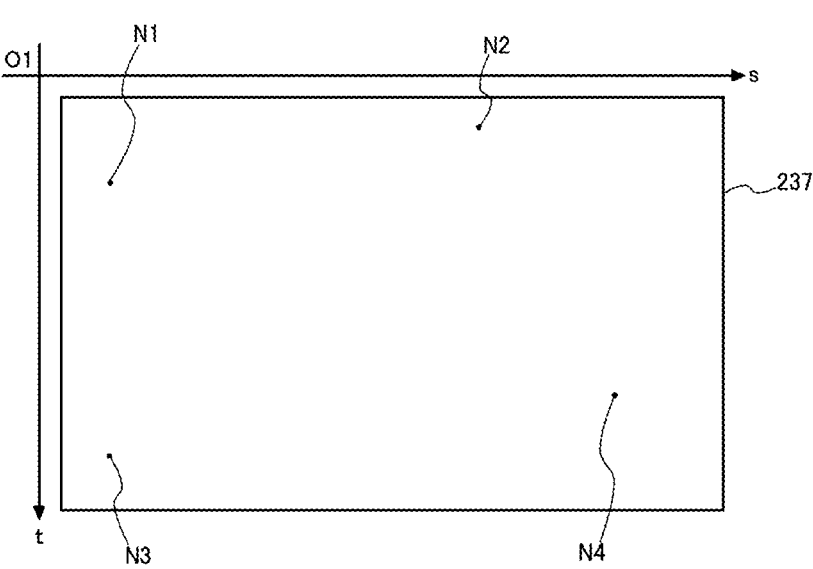
FIG. 6 shows positions of four vertices of a projection area in a panel coordinate system.

FIG. 6 shows positions of the four vertices of the projection area 51 in the panel coordinate system.

The second control unit 250 transforms the coordinates of the four vertices M1, M2, M3, and M4 of the projection area 51 from the coordinates in the imaging coordinate system into the coordinates in the panel coordinate system using the calculated projective transformation matrix. The second control unit 250 transforms the coordinates of the four vertices M1, M2, M3, and M4 in the imaging coordinate system of the projection area 51 into the coordinates of the four vertices in the panel coordinate system using the projective transformation matrix. The four vertices in the panel coordinate system of the four vertices M1, M2, M3, and M4 of the projection area 51 are referred to as "vertices N1, N2, N3, and N4". An area determined by the four vertices N1, N2, N3, and N4 in the panel coordinate system transformed using the projective transformation matrix calculated based on the first captured image 70A and the first image 10 corresponds to a first area.

Figure 7:
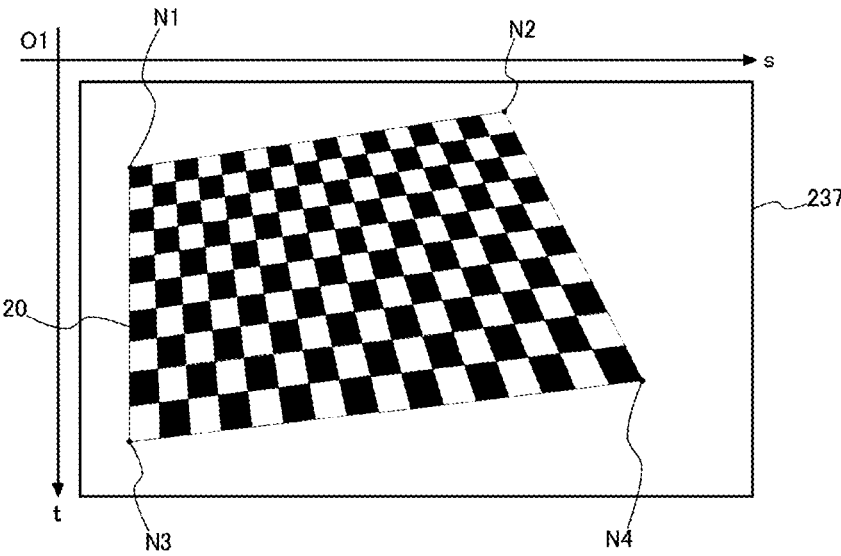
FIG. 7 shows an example of a second image drawn on the liquid crystal panel.

FIG. 7 shows an example of the second image 20 drawn on the liquid crystal panel 235.

The second control unit 250 generates the second image 20 based on the four vertices M1, M2, M3, and M4 of the projection area 51 and the four vertices N1, N2, N3, and N4 in the panel coordinate system. The second image 20 is generated in a second size larger than the first size of the first image 10. The second control unit 250 generates the second image 20 so that the four vertices of the second image 20 may be located in the positions of the vertices N1, N2, N3, and N4, respectively. Also, the second image 20 is a pattern image in which the first rectangular FIG. 11 and the second rectangular FIG. 13 are alternately arranged in the longitudinal directions and the lateral directions of the second image 20 like the first image 10. However, the pluralities of first rectangular FIG. 11 and second rectangular FIG. 13 contained in the second image 20 do not have the same shape or the same size. This is because the shape of the second image 20 is deformed to correspond to the distortion of the first image 10 displayed in the projection area 51.

Further, the second control unit 250 may generate a projective transformation matrix and generate the second image 20 by deforming the first image 10 using the generated projective transformation matrix.

The second control unit 250 generates the projective transformation matrix based on the coordinates in the panel coordinate system of the first contact point T1, the second contact point T2, the third contact point T3, and the fourth contact point T4 of the first image 10 and the coordinates in the panel coordinate system of the vertices N1, N2, N3, and N4. The second control unit 250 may generate the second image 20 by transforming the coordinates of the individual vertices of the first rectangular FIG. 11 and the second rectangular FIG. 13 contained in the first image 10 using the generated projective transformation matrix.

Figure 8:
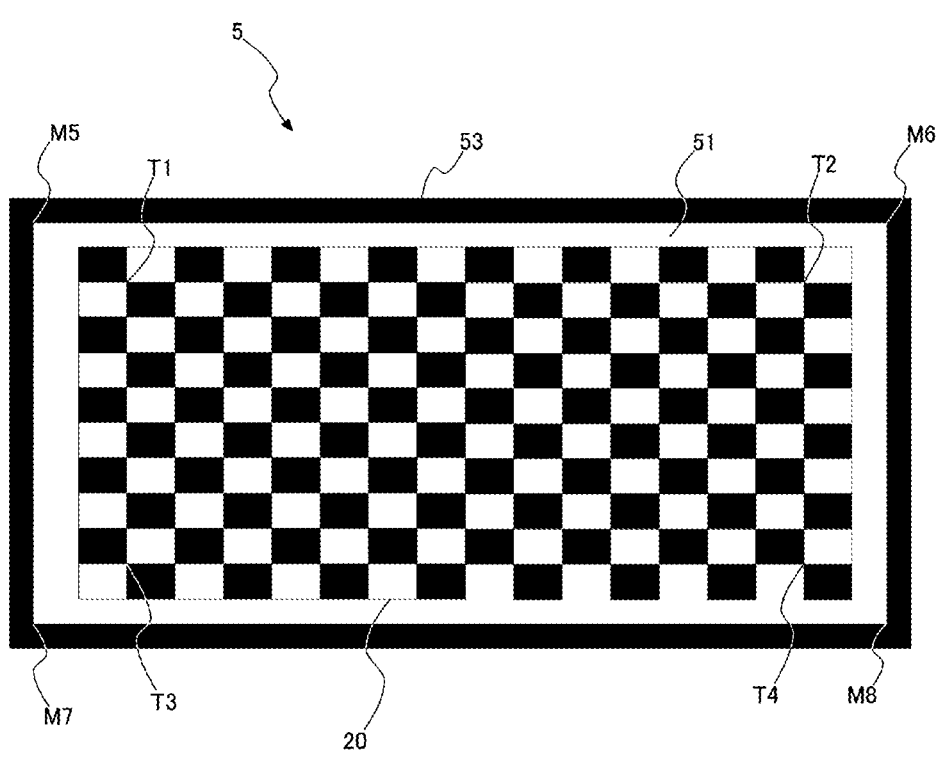
FIG. 8 shows an example of the second image projected on the screen.

FIG. 8 shows an example of the second image 20 projected on the screen 5.

The second control unit 250 generates the second image 20, and then, controls the image processing unit 220 and the image projection unit 230 to draw the generated second image 20 in the panel area 237 of the liquid crystal panel 235. The light output from the light source 231 is transmitted through the panel area 237 and modulated into an image light corresponding to the second image 20, and the modulated image light is displayed in the projection area 51. The second image 20 is displayed within the projection area 51 of the screen 5 near the boundary line between the projection area 51 and the background area 53 compared to the first image 10. Accordingly, the error due to the influence by the distortion parameter of the camera 120 may be reduced and the coordinates in the panel coordinate system of the second image 20 and the projection area 51 may be accurately detected based on the captured image 70 of the camera 120.

Figure 9:
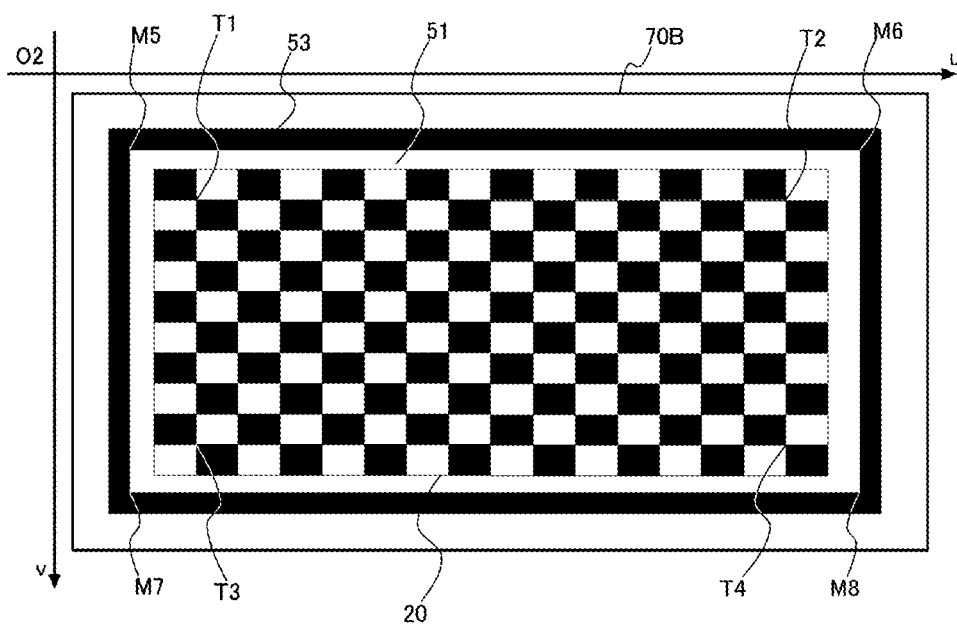
FIG. 9 shows an example of a second captured image.

FIG. 9 shows an example of a second captured image 70B.

Hereinafter, the captured image 70 formed by imaging of the screen 5 with the second image 20 displayed thereon is referred to as "second captured image 70B".

The second control unit 250 performs the same processing as that when the above described first image 10 is displayed on the screen 5 and receives the second captured image 70B from the information processing apparatus 100. The second control unit 250 performs an image analysis on the received second captured image 70B and detects the second image 20 and the projection area 51.

The second control unit 250 detects the four contact points of the first contact point T1, the second contact point T2, the third contact point T3, and the fourth contact point T4 shown in FIG. 9 as the second image 20 from the second captured image 70B. Specifically, the second control unit 250 acquires the coordinates of the four contact points of the first contact point T1, the second contact point T2, the third contact point T3, and the fourth contact point T4 in the imaging coordinate system set on the second captured image 70B. Further, the second control unit 250 detects coordinates of four vertices M5, M6, M7, and M8 of the projection area 51 based on the changes in brightness value of the second captured image 70B. The four contact points of the first contact point T1, the second contact point T2, the third contact point T3, and the fourth contact point T4 in the imaging coordinate system set on the second captured image 70B correspond to four points contained in the second image in the second captured image.

Then, the second control unit 250 calculates a projective transformation matrix based on the four coordinates in the panel coordinate system of the first contact point T1, the second contact point T2, the third contact point T3, and the fourth contact point T4 in the second image 20 and the four coordinates in the imaging coordinate system of the first contact point T1, the second contact point T2, the third contact point T3, and the fourth contact point T4 in the second captured image 70B.

The four contact points of the first contact point T1, the second contact point T2, the third contact point T3, and the fourth contact point T4 of the second image 20 in the panel coordinate system correspond to four points contained in the second image in the drawing panel. Further, the four contact points of the first contact point T1, the second contact point T2, the third contact point T3, and the fourth contact point T4 of the second image 20 in the panel coordinate system correspond to the respective four contact points of the first contact point T1, the second contact point T2, the third contact point T3, and the fourth contact point T4 in the imaging coordinate system set on the second captured image 70B.

Figure 10:
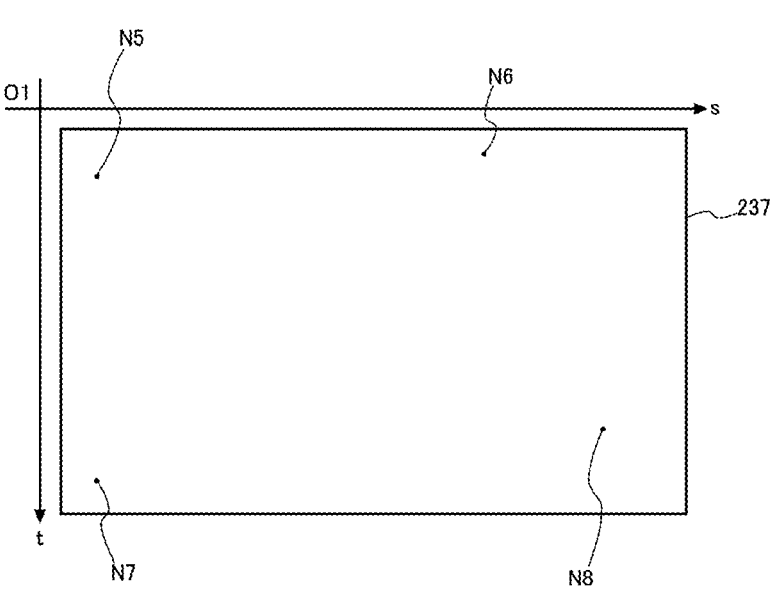
FIG. 10 shows positions of four vertices of the projection area in the panel coordinate system.

FIG. 10 shows positions of the four vertices of the projection area in the panel coordinate system. FIG. 11 shows an example of a projection image 30 displayed on the screen 5.

The second control unit 250 transforms the coordinates of the four vertices M5, M6, M7, and M8 of the projection area 51 into the coordinates in the panel coordinate system using the calculated projective transformation matrix. The four vertices transformed to the coordinates in the panel coordinate system are referred to as "N5, N6, N7, and N8". The second control unit 250 generates the projection image 30 so that the four vertices may be respectively located in the positions of the vertices N5, N6, N7, and N8. The second control unit 250 generates the projection image 30, and then, controls the image processing unit 220 and the image projection unit 230 to draw the generated projection image 30 in the panel area 237 of the liquid crystal panel 235. The light output from the light source 231 is transmitted through the panel area 237 and modulated into an image light corresponding to the projection image 30, and the modulated image light is displayed in the projection area 51. An area determined by the four vertices N5, N6, N7, and N8 in the panel coordinate system transformed using the projective transformation matrix calculated based on the second captured image 70B and the second image 20 corresponds to a second area.

Figure 12:
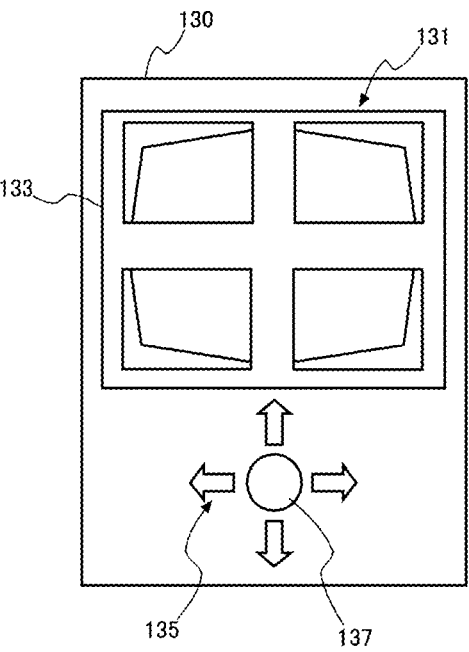
FIG. 12 shows an example of an operation window displayed on a touch panel.

FIG. 12 shows an example of an operation window 131 displayed on the touch panel 130 of the information processing apparatus 100.

The second control unit 250 displays the projection image 30 on the screen 5, and then, transmits a start instruction for quick corner correction to the information processing apparatus 100.

When receiving the start instruction for quick corner correction from the projector 200, the first control unit 150 displays the operation window 131 shown in FIG. 12 on the touch panel 130.

In the operation window 131, a selection window 133 for selection of the vertex to be corrected, arrow keys 135, and an enter key 137 are displayed.

The user operates the arrow key 135 and selects the vertex of the projection image 30 for quick corner correction. When the vertex of the projection image 30 is selected and the enter key 137 is pressed down, the first control unit 150 determines that the vertex of the projection image 30 for quick corner correction is selected. The first control unit 150 transmits information of the selected vertex of the projection image 30 to the projector 200.

Then, the user presses down the arrow key 135 in the direction in which the user desires to move the selected vertex of the projection image 30. The first control unit 150 transmits an operation signal corresponding to the pressed down arrow key 135 to the projector 200 while the arrow key 135 is pressed down. While receiving the operation signal from the information processing apparatus 100, the second control unit 250 moves the selected vertex of the projection image 30 in the direction corresponding to the pressed down arrow key 135. That is, the second control unit 250 moves the position of the panel area 237 in which the selected vertex of the projection image 30 is drawn in the direction corresponding to the pressed down arrow key 135. When the operation of the arrow key 135 becomes undetectable, the first control unit 150 ends the transmission of the operation signal to the projector 200. Further, when the enter key 137 is pressed down, the first control unit 150 transmits an operation signal to instruct to end the quick corner correction to the projector 200.

4. Operation of Projector

FIG. 13 is a flowchart showing an operation of the projector 200. The operation of the projector 200 is explained with reference to the flowchart shown in FIG. 13.

The second control unit 250 determines whether an instruction signal to instruct the start of image adjustment is received from the information processing apparatus 100 (step S1). When the instruction signal is not received (step S1/NO), the second control unit 250 waits for a start of processing until the instruction signal is received.

When the instruction signal is received from the information processing apparatus 100 (step S1/YES), the second control unit 250 displays the first image 10 on the screen 5 (step S2).

Then, the second control unit 250 transmits the imaging instruction for the first captured image 70A and the acquisition request for the first captured image 70A to the information processing apparatus 100 (step S3). Then, the second control unit 250 determines whether the first captured image 70A is received from the information processing apparatus 100 (step S4), and, when the first captured image 70A is not received (step S4/NO), waits for a start of the next processing until the first captured image 70A is received.

When the first captured image 70A is received from the information processing apparatus 100 (step S4/YES), the second control unit 250 performs the image analysis of the received first captured image 70A. The second control unit 250 detects the four contact points of the first contact point T1, the second contact point T2, the third contact point T3, and the fourth contact point T4 of the first image 10 from the first captured image 70A (step S5).

Then, the second control unit 250 analyzes the first captured image 70A and detects the four vertices M1, M2, M3, and M4 of the projection area 51 (step S6).

Then, the second control unit 250 calculates the projective transformation matrix (step S7).

The second control unit 250 calculates the projective transformation matrix based on the four coordinates in the panel coordinate system of the first contact point T1, the second contact point T2, the third contact point T3, and the fourth contact point T4 and the four coordinates in the imaging coordinate system of the first contact point T1, the second contact point T2, the third contact point T3, and the fourth contact point T4.

Then, the second control unit 250 transforms the coordinates of the four vertices M1, M2, M3, and M4 of the projection area 51 into the coordinates of the four vertices N1, N2, N3, and N4 in the panel coordinate system using the calculated projective transformation matrix (step S8).

Then, the second control unit 250 generates the second image 20 based on the calculated coordinates of the four vertices N1, N2, N3, and N4 of the projection area 51 in the panel coordinate system (step S9). The second control unit 250 generates the second image 20 so that the four vertices may be located in the positions of the four vertices N1, N2, N3, and N4.

Then, the second control unit 250 displays the generated second image 20 on the screen 5 (step S10). Then, the second control unit 250 transmits the imaging instruction for the second captured image 70B and the acquisition request for the second captured image 70B to the information processing apparatus 100 (step S11). The second control unit 250 determines whether the second captured image 70B is received from the information processing apparatus 100 (step S12). When the second captured image 70B is not received from the information processing apparatus 100 (step S12/NO), the second control unit 250 waits until the second captured image 70B is received.

When the second captured image 70B is received from the information processing apparatus 100 (step S12/YES), the second control unit 250 detects the four contact points of the first contact point T1, the second contact point T2, the third contact point T3, and the fourth contact point T4 of the second image 20 like that at step S5 (step S13). Further, the second control unit 250 detects the four vertices of the projection area 51 like that at steps S6 and S7 (step S14) and calculates the projective transformation matrix (step S15).

Furthermore, the second control unit 250 transforms the four vertices M1, M2, M3, and M4 of the projection area 51 into the coordinates of the four vertices N1, N2, N3, and N4 in the panel coordinate system using the projective transformation matrix, and obtains the coordinates of the four vertices in the panel coordinate system (step S16). The second control unit 250 generates the projection image 30 based on the transformed four vertices N1, N2, N3, and N4 in the panel coordinate system (step S17).

The second control unit 250 displays the generated projection image 30 on the screen 5 (step S18), and transmits the start instruction for quick corner correction to the information processing apparatus 100 (step S19). Then, the second control unit 250 determines whether the operation signal indicating the vertex to be corrected is received from the information processing apparatus 100 (step S20).

When the operation signal indicating the vertex to be corrected is not received (step S20/NO), the second control unit 250 determines whether the operation signal for instructing an end of the quick corner correction is received from the information processing apparatus 100 (step S21). When the operation signal for instructing an end of the quick corner correction is not received (step S21/NO), the second control unit 250 returns to the determination at step S20. Further, when the operation signal for instructing an end of the quick corner correction is received (step S21/YES), the second control unit 250 ends the processing flow.

Or, when the operation signal indicating the vertex to be corrected is received (step S20/YES), the second control unit 250 determines whether the operation signal corresponding to the operated arrow key is received (step S22). When the operation signal corresponding to the operation of the arrow key is not received (step S22/NO), the second control unit 250 goes to the determination at step S21.

Or, when the operation signal corresponding to the operated arrow key is received (step S22/YES), the second control unit 250 moves the position of the panel area 237 in which the selected vertex of the projection image 30 is drawn in the direction indicated by the operation signal (step S23). Then, the second control unit 250 determines whether reception of the operation signal corresponding to the arrow key 135 is continued (step S22).

5. Effects of Method of Adjusting Projection Image

As described above, the second control unit 250 of the projector 200 of the embodiment executes the following processing.

The second control unit 250 draws the first image 10 having the first size on the liquid crystal panel 235 and projects the image light corresponding to the first image 10 drawn on the liquid crystal panel 235 on the screen 5.

Further, the second control unit 250 detects the projection area 51 and the first image 10 from the first captured image 70A formed by imaging of the screen 5 with the image light corresponding to the first image 10 projected thereon.

Then, the second control unit 250 specifies the first area in the liquid crystal panel 235 corresponding to the projection area 51 based on the projection area 51 in the first captured image 70A, the first image 10 in the first captured image 70A, and the first image 10 in the liquid crystal panel 235.

Further, the second control unit 250 draws the second image 20 having the second size larger than the first size within the first area and projects the image light corresponding to the second image 20 drawn on the liquid crystal panel 235 on the screen 5.

The second control unit 250 detects the projection area 51 and the second image 20 from the second captured image 70B formed by imaging of the screen 5 with the image light corresponding to the second image 20 projected thereon.

Then, the second control unit 250 specifies the second area in the liquid crystal panel 235 corresponding to the projection area 51 based on the projection area 51 in the second captured image 70B, the second image 20 in the second captured image 70B, and the second image 20 in the liquid crystal panel 235.

Further, the second control unit 250 draws the projection image within the second area and projects the image light corresponding to the projection image on the screen 5.

According to the configuration, the first size of the first image 10 is smaller than the second size of the second image 20. The first image 10 smaller than the panel area 237 of the liquid crystal panel 235 is first displayed on the screen 5, and thereby, the first image 10 may be displayed on the screen 5 not to spread outside the projection area 51. Accordingly, when the first image 10 is detected from the first captured image 70A, a probability of an unsuccessful detection of the first image 10 may be reduced.

Further, the projection area 51 and the first image 10 are detected from the first captured image 70A, the area of the liquid crystal panel 235 corresponding to the projection area 51 is specified, and the second image 20 is drawn in the specified area of the liquid crystal panel 235 corresponding to the projection area 51. Then, the second image 20 drawn on the liquid crystal panel 235 is displayed on the screen 5. Accordingly, the influence by the lens distortion of the camera 120 that captures the first captured image 70A and the second captured image 70B may be reduced and the area of the liquid crystal panel 235 corresponding to the projection area 51 may be accurately specified. Therefore, the projection image projected by the projector 200 may be accurately conformed to the shape of the projection area 51.

The first image 10 and the second image 20 are the rectangular images and the first image 10 and the second image 20 include at least four images having preset shapes.

According to the configuration, the images having the preset shapes are detected from the first captured image and the second captured image, and thereby, the areas of the first image 10 and the second image 20 may be accurately detected.

Detecting the projection area 51 and the first image 10 from the first captured image 70A is detecting the vertices of the projection area 51 and the points of the first image 10.

According to the configuration, the vertices of the projection area 51 and the points of the first image 10 are detected from the first captured image 70A, and thereby, the projection area 51 and the first image 10 may be detected.

The first image 10 is the rectangular image.

The second control unit 250 calculates the projective transformation matrix based on the four points contained in the first image 10 in the first captured image 70A and the four points contained in the first image 10 in the liquid crystal panel 235 corresponding to the respective four points in the first captured image. The second control unit 250 detects the positions in the liquid crystal panel 235 of the four vertices of the projection area 51 detected from the first captured image 70A using the calculated projective transformation matrix.

According to the configuration, the area of the liquid crystal panel 235 corresponding to the projection area 51 may be accurately specified.

The second image 20 is the rectangular image.

The second control unit 250 calculates the projective transformation matrix based on the four points contained in the second image 20 in the second captured image 70B and the four points contained in the second image 20 in the liquid crystal panel 235 corresponding to the respective four points in the second captured image. The second control unit 250 detects the positions in the liquid crystal panel 235 of the four vertices of the projection area 51 detected from the second captured image 70B using the calculated projective transformation matrix.

According to the configuration, the area of the liquid crystal panel 235 corresponding to the projection area 51 may be accurately specified.

6. Modified Examples

Figure 14:
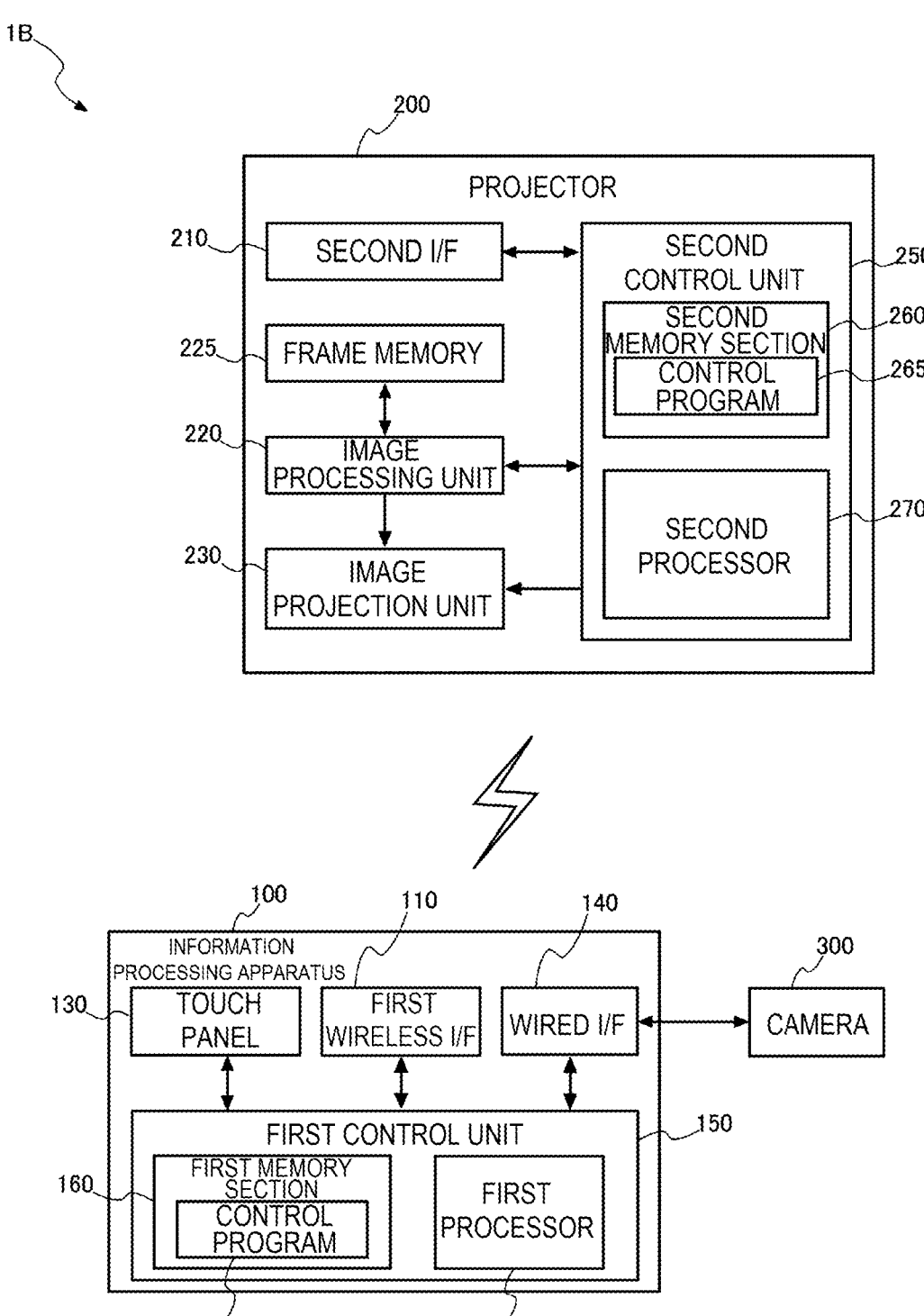
FIG. 14 shows another system configuration of the projection system.

FIG. 14 shows a configuration of a projection system 1B as another form of the projection system 1A shown in FIG. 1.

In the projection system 1B shown in FIG. 14, the information processing apparatus 100 does not include the camera 120 and the information processing apparatus 100 includes a wired I/F 140 and is coupled to an external camera 300 via wired connection. The coupling between the information processing apparatus 100 and the camera 300 may be via wireless connection by near field wireless communication including Wi-Fi and Bluetooth. The camera 300 corresponds to an imaging apparatus and the information processing apparatus 100 corresponds to a control apparatus.

Further, in the modified example, the processing performed by the second control unit 250 of the above described projector 200 is executed by the first control unit 150 of the information processing apparatus 100.

The first control unit 150 receives the first captured image 70A formed by imaging of the screen 5 with the first image 10 displayed thereon from the camera 300.

Further, the first control unit 150 receives information of the first image 10 drawn on the liquid crystal panel 235 of the projector 200 from the projector 200. The information of the first image 10 includes the coordinates of the first contact point T1, the second contact point T2, the third contact point T3, and the fourth contact point T4 contained in the first image 10. The coordinates are coordinates in the panel coordinate system.

The first control unit 150 performs an image analysis on the received first captured image 70A and detects the first image 10 and the projection area 51. More specifically, the first control unit 150 detects the coordinates in the imaging coordinate system of the first contact point T1, the second contact point T2, the third contact point T3, and the fourth contact point T4 of the first image 10. Further, the control unit 150 detects the coordinates in the imaging coordinate system of the four vertices M1, M2, M3, and M4 of the projection area 51.

The first control unit 150 calculates the projective transformation matrix. The first control unit 150 calculates the projective transformation matrix based on the coordinates in the imaging coordinate system of the first contact point T1, the second contact point T2, the third contact point T3, and the fourth contact point T4 and the coordinates in the panel coordinate system of the first contact point T1, the second contact point T2, the third contact point T3, and the fourth contact point T4 received from the projector 200.

Then, the first control unit 150 transforms the coordinates of the four vertices M1, M2, M3, and M4 of the projection area 51 into the coordinates of the four vertices N1, N2, N3, and N4 in the panel coordinate system using the calculated projective transformation matrix. The first control unit 150 transmits information of the transformed coordinates of the four vertices N1, N2, N3, and N4 in the panel coordinate system to the projector 200.

The projector 200 generates the second image 20 based on the coordinates of the four vertices N1, N2, N3, and N4 received from the information processing apparatus 100 and displays the generated second image 20 on the screen 5.

The information processing apparatus 100 receives the second captured image 70B formed by imaging of the screen 5 with the second image 20 displayed thereon from the camera 300.

The first control unit 150 performs an image analysis on the second captured image 70B like the image analysis on the first captured image 70A and calculates the coordinates in the panel coordinate system of the four vertices N5, N6, N7, and N8 of the projection area 51. The first control unit 150 transmits the calculated coordinates in the panel coordinate system of the four vertices N5, N6, N7, and N8 of the projection area 51 to the projector 200.

The projector 200 generates the projection image 30 based on the coordinates in the panel coordinate system of the four vertices N5, N6, N7, and N8 of the projection area 51 received from the information processing apparatus 100 and displays the generated projection image 30 on the screen 5.

7. Effects of Projection System

As described above, the projection system 1A of the embodiment includes the projector 200 and the information processing apparatus 100 including the camera 120 and the first control unit 150.

The projector 200 includes the liquid crystal panel 235 and projects the image light corresponding to the first image 10 having the first size drawn on the liquid crystal panel 235 on the screen 5.

The camera 120 images the screen 5 with the image light corresponding to the first image 10 projected thereon and generates the first captured image 70A. The first control unit 150 detects the projection area 51 and the first image 10 from the first captured image 70A.

The first control unit 150 specifies the first area in the liquid crystal panel 235 corresponding to the projection area 51 based on the projection area 51 in the first captured image 70A, the first image 10 in the first captured image 70A, and the first image in the liquid crystal panel 235.

The first control unit 150 transmits the first information representing the first area to the projector 200.

Further, the projector 200 draws the second image 20 having the second size larger than the first size within the first area represented by the first information and projects the image light corresponding to the second image 20 on the screen 5.

The camera 120 images the screen 5 with the image light corresponding to the second image 20 projected thereon and generates the second captured image 70B.

The first control unit 150 detects the projection area 51 and the second image 20 from the second captured image 70B.

The first control unit 150 specifies the second area of the liquid crystal panel 235 corresponding to the projection area 51 based on the projection area 51 in the second captured image 70B, the second image 20 in the second captured image 70B, and the second image 20 in the liquid crystal panel 235.

The first control unit 150 transmits the second information representing the second area to the projector 200.

According to the configuration, the first size of the first image 10 is smaller than the second size of the second image 20. The first image 10 smaller than the panel area 237 of the liquid crystal panel 235 is first displayed on the screen 5, and thereby, the first image 10 may be displayed on the screen

5 not to spread outside the projection area 51. Accordingly, when the first image 10 is detected from the first captured image 70A, a probability of an unsuccessful detection of the first image 10 may be reduced.

Further, the projection area 51 and the first image 10 are detected from the first captured image 70A, the area of the liquid crystal panel 235 corresponding to the projection area 51 is specified, and the second image 20 is drawn in the specified area of the liquid crystal panel 235 corresponding to the projection area 51. Then, the second image 20 drawn on the liquid crystal panel 235 is displayed on the screen 5. Accordingly, the influence by the lens distortion of the camera 120 that captures the first captured image 70A and the second captured image 70B may be reduced and the area of the liquid crystal panel 235 corresponding to the projection area 51 may be accurately specified. Therefore, the projection image projected by the projector 200 may be accurately conformed to the shape of the projection area 51.

8. Effects of Control Apparatus

As described above, the first control unit 150 of the embodiment receives the first captured image 70A formed by imaging of the screen 5 with the image light corresponding to the first image 10 having the first size projected thereon from the camera 300. Further, the first control unit 150 receives the information of the first image 10 drawn on the liquid crystal panel 235 of the projector 200 from the projector 200 projecting the image light corresponding to the first image 10.

The first control unit 150 detects the projection area 51 and the first image 10 from the first captured image 70A. The first control unit 150 specifies the first area in the drawing panel 235 corresponding to the projection area 51 based on the projection area 51 in the first captured image 70A, the first image in the first captured image 70A, and the information of the first image.

The first control unit 150 transmits the first information representing the first area to the projector 200.

The first control unit 150 receives the second captured image 70B formed by imaging of the screen 5 with the image light corresponding to the second image 20 having the second size larger than the first size projected thereon from the camera 300.

The first control unit 150 detects the projection area 51 and the second image 20 from the second captured image 70B.

The first control unit 150 specifies the second area in the drawing panel 235 corresponding to the projection area 51 based on the projection area 51 in the second captured image 70B, the second image 20 in the second captured image 70B, and the first information.

The first control unit 150 transmits the second information representing the second area to the projector 200.

According to the configuration, the first size of the first image 10 is smaller than the second size of the second image 20. The first image 10 smaller than the panel area 237 of the liquid crystal panel 235 is first displayed on the screen 5, and thereby, the first image 10 may be displayed on the screen 5 not to spread outside the projection area 51. Accordingly, when the first image 10 is detected from the first captured image 70A, a probability of an unsuccessful detection of the first image 10 may be reduced.

Further, the projection area 51 and the first image 10 are detected from the first captured image 70A, the area of the liquid crystal panel 235 corresponding to the projection area 51 is specified, and the second image 20 is drawn in the specified area of the liquid crystal panel 235 corresponding to the projection area 51. Then, the second image 20 drawn on the liquid crystal panel 235 is displayed on the screen 5. Accordingly, the influence by the lens distortion of the camera 120 that captures the first captured image 70A and the second captured image 70B may be reduced and the area of the liquid crystal panel 235 corresponding to the projection area 51 may be accurately specified. Therefore, the projection image projected by the projector 200 may be accurately conformed to the shape of the projection area 51.

The above described embodiments are preferred embodiments of the present disclosure. Note that the present disclosure is not limited to the above described embodiments, but various modifications can be made without departing from the scope of the present disclosure.

Figure 15:
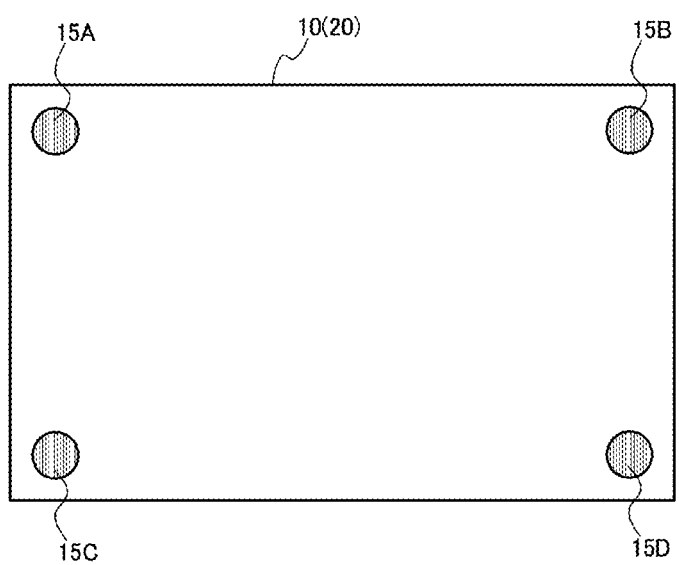
FIG. 15 shows another example of the first image and the second image.

For example, the first image 10 and the second image 20 may be images shown in FIG. 15. The first image 10 shown in FIG. 15 is an image in which dots 15A, 15B, 15C, and 15D as images having preset shapes are placed in positions corresponding to four corners of the first image 10. FIG. 15 shows the images in circular shapes as preset shapes, however, the shapes of the images may be triangular or rectangular. Further, in the first image 10, the dots 15A, 15B, 15C, and 15D are not necessarily placed in the positions corresponding to the four corners. An image containing at least four images having preset shapes may be used.

Further, the image patterns formed in the first image 10 and the second image 20 may be different. For example, as the first image 10, an image in which the dots 15A, 15B, 15C, and 15D are placed in the positions corresponding to the four corners may be used and, as the second image 20, the pattern image shown in FIG. 8 may be used.

Furthermore, it is only necessary that the first image 10 and the second image 20 have a difference in the sizes of the diagonal lines, sizes in the longitudinal directions, sizes in the horizontal directions, or the like of the first rectangular FIG. 11 and second rectangular FIG. 13.

The light modulation elements of the light modulation device 233 may be transmissive liquid crystal panels or reflective liquid crystal panels. Or, the light modulation elements may have configurations using DMDs or configurations combining DMDs and a color wheel. Or, the light modulation device 233 may employ another configuration that can modulate the light emitted from the light source than the liquid crystal panels or DMDs. In the above described embodiments, three liquid crystal panels 235R, 235G, 235B corresponding to the three colors of red, green, and blue are used, however, the present disclosure is not limited to that. A single liquid crystal panel may be used or three DMDs corresponding to three colors of red, green, and blue may be used. The drawing panel may be one that may adjust the projected light from the light source by reflection, transmission, or modulation for formation of the projection image displayed by the projector 200. Drawing by the drawing panel corresponds to adjustment of the projected light from the light source by reflection, transmission, or modulation.

The individual functional units of the projector 200 and the information processing apparatus 100 shown in FIG. 1 show the functional configurations and the specific implementation forms are not particularly limited. That is, hardware individually corresponding to the individual functional units is not necessarily implemented and, obviously, functions of a plurality of functional units can be realized by one or more processors executing programs. Or, in the above described embodiments, part of the functions realized by software may be realized by hardware, or part of the functions realized by hardware may be realized by software.

In addition, specific detailed configurations of the other individual units of the projector can be arbitrarily changed without departing from the scope of the present disclosure.

When the method of adjusting the projection image is realized by a computer provided in the projector 200 or a computer provided in the information processing apparatus 100, a program to be executed by the computer can be configured in a form of a storage medium or a transmission medium transmitting the program. For the storage medium, a magnetic optical storage medium or a semiconductor memory device may be used. Specifically, the storage medium includes a portable or stationary storage medium such as a flexible disk, an HDD (Hard Disk Drive), a CD-ROM, a DVD, a Blu-ray Disc, a magnetooptical disk, a flash memory, and a card-type storage medium. Or, the above described storage medium may be a non-volatile storage device such as a RAM, a ROM, or an HDD as an internal storage device provided in a server apparatus. Blu-ray is a registered trademark.

What is claimed is:

1. A method of adjusting a projection image comprising:

drawing a first image having a first size on a drawing panel;

projecting the first image on a projection surface;

detecting an area of the projection surface and the first image from a first captured image formed by imaging of the projection surface with the first image projected thereon;

specifying a first area in the drawing panel corresponding to the area of the projection surface based on the area of the projection surface in the first captured image, the first image in the first captured image, and the first image in the drawing panel;

drawing a second image having a second size larger than the first size within the first area;

projecting the second image on the projection surface;

detecting the area of the projection surface and the second image from a second captured image formed by imaging of the projection surface with the second image projected thereon;

specifying a second area in the drawing panel corresponding to the area of the projection surface based on the area of the projection surface in the second captured image, the second image in the second captured image, and the second image in the drawing panel;

drawing a projection image within the second area; and projecting the projection image on the projection surface, wherein a background area surrounds and contacts the outside of the projection surface at a boundary line;

the size of the first image is drawn so that the first image is displayed on the projection surface and not in the background area;

the first image and the second image are rectangular images;

the second size of the second image is enlarged so that the second image is displayed adjacent all of the boundary lines between the projection surface and the background area;

a projective transformation matrix is calculated based on four points contained in the first image in the first captured image and four points contained in the first image in the drawing panel corresponding to the respective four points in the first captured image;

positions of four vertices of the projection surface detected from the first captured image in the drawing panel are detected using the projective transformation matrix; and the second image is a pattern deformed to correspond to distortion of the first image projected on the projection surface by generating so that each of the four vertices of the second image in the drawing panel is located in each of the positions of four vertices of the projection surface detected from the first captured image in the drawing panel detected using the projective transformation matrix.

2. The method of adjusting a projection image according to claim 1, wherein the first image and the second image include at least four images having preset shapes.

3. The method of adjusting a projection image according to claim 2, wherein the detecting the area of the projection surface and the first image from the first captured image is detecting vertices of the projection surface and points of the first image.

4. The method of adjusting a projection image according to claim 1, wherein a projective transformation matrix is calculated based on four points contained in the second image in the second captured image and four points contained in the second image in the drawing panel corresponding to the respective four points in the second captured image, and positions of four vertices of the projection surface detected from the second captured image in the drawing panel are detected based on the projective transformation matrix.

5. A projection system comprising:

a projector including a drawing panel and one or more processors programmed for projecting a first image having a first size drawn on the drawing panel on a projection surface;

a camera imaging the projection surface with the first image projected thereon and generating a first captured image; and a control apparatus including one or more processors programmed for executing detecting an area of the projection surface and the first image from the first captured image, specifying a first area in the drawing panel corresponding to the area of the projection surface based on the area of the projection surface in the first captured image, the first image in the first captured image, and the first image in the drawing panel, and transmitting first information representing the first area to the projector, wherein the projector one or more processors further execute drawing a second image having a second size larger than the first size within the first area represented by the first information, and projecting the second image on the projection surface, the imaging apparatus generates a second captured image by imaging the projection surface with the second image projected thereon, and the control apparatus one or more processors further execute detecting the area of the projection surface and the second image from the second captured image, specifying a second area in the drawing panel corresponding to the area of the projection surface based on the area of the projection surface in the second captured image, the second image in the second captured image, and the second image in the drawing panel, and transmitting second information representing the second area to the projector, wherein a background area surrounds and contacts the outside of the projection surface at a boundary line;

the size of the first image is drawn so that the first image is displayed on the projection surface and not in the background area;

the first image and the second image are rectangular images;

the second size of the second image is enlarged so that the second image is displayed adjacent all of the boundary lines between the projection surface and the background area;

a projective transformation matrix is calculated based on four points contained in the first image in the first captured image and four points contained in the first image in the drawing panel corresponding to the respective four points in the first captured image;

positions of four vertices of the projection surface detected from the first captured image in the drawing panel are detected using the projective transformation matrix; and the second image is a pattern deformed to correspond to distortion of the first image projected on the projection surface by generating so that each of the four vertices of the second image in the drawing panel is located in each of the positions of four vertices of the projection surface detected from the first captured image in the drawing panel detected using the projective transformation matrix.

6. A control apparatus including one or more processors programmed for executing receiving a first captured image formed by imaging of a projection surface with a first image having a first image projected thereon from an imaging apparatus, receiving information of the first image drawn on a drawing panel of a projector from the projector projecting the first image on the projection surface, detecting an area of the projection surface and the first image from the first captured image, specifying a first area in the drawing panel corresponding to the area of the projection surface based on the area of the projection surface in the first captured image, the first image in the first captured image, and the information of the first image, transmitting first information representing the first area to the projector, receiving a second captured image formed by imaging of the projection surface with a second image, having a second size larger than the first image, projected thereon from the imaging apparatus, detecting the area of the projection surface and the second image from the second captured image, specifying a second area in the drawing panel corresponding to the area of the projection surface based on the area of the projection surface in the second captured image, the second image in the second captured image, and the first information, and transmitting second information representing the second area to the projector, wherein a background area surrounds and contacts the outside of the projection surface at a boundary line;

the size of the first image is drawn so that the first image is displayed on the projection surface and not in the background area;

the first image and the second image are rectangular images; and the second size of the second image is enlarged so that the second image is displayed adjacent all of the boundary lines between the projection surface and the background area;

a projective transformation matrix is calculated based on four points contained in the first image in the first captured image and four points contained in the first image in the drawing panel corresponding to the respective four points in the first captured image;

positions of four vertices of the projection surface detected from the first captured image in the drawing panel are detected using the projective transformation matrix; and the second image is a pattern deformed to correspond to distortion of the first image projected on the projection surface by generating so that each of the four vertices of the second image in the drawing panel is located in each of the positions of four vertices of the projection surface detected from the first captured image in the drawing panel detected using the projective transformation matrix.

7. The projection system according to claim 5, wherein the first image and the second image include at least four images having preset shapes.

8. The projection system according to claim 7, wherein the detecting the area of the projection surface and the first image from the first captured image is detecting vertices of the projection surface and points of the first image.

9. The projection system according to claim 5, wherein a projective transformation matrix is calculated based on four points contained in the second image in the second captured image and four points contained in the second image in the drawing panel corresponding to the respective four points in the second captured image, and positions of four vertices of the projection surface detected from the second captured image in the drawing panel are detected based on the projective transformation matrix.

10. The control apparatus according to claim 6, wherein the first image and the second image include at least four images having preset shapes.

11. The control apparatus according to claim 10, wherein the detecting the area of the projection surface and the first image from the first captured image is detecting vertices of the projection surface and points of the first image.

12. The control apparatus according to claim 6, wherein a projective transformation matrix is calculated based on four points contained in the second image in the second captured image and four points contained in the second image in the drawing panel corresponding to the respective four points in the second captured image, and positions of four vertices of the projection surface detected from the second captured image in the drawing panel are detected based on the projective transformation matrix.

* * * * *